UNITED STATES PATENT OFFICE.

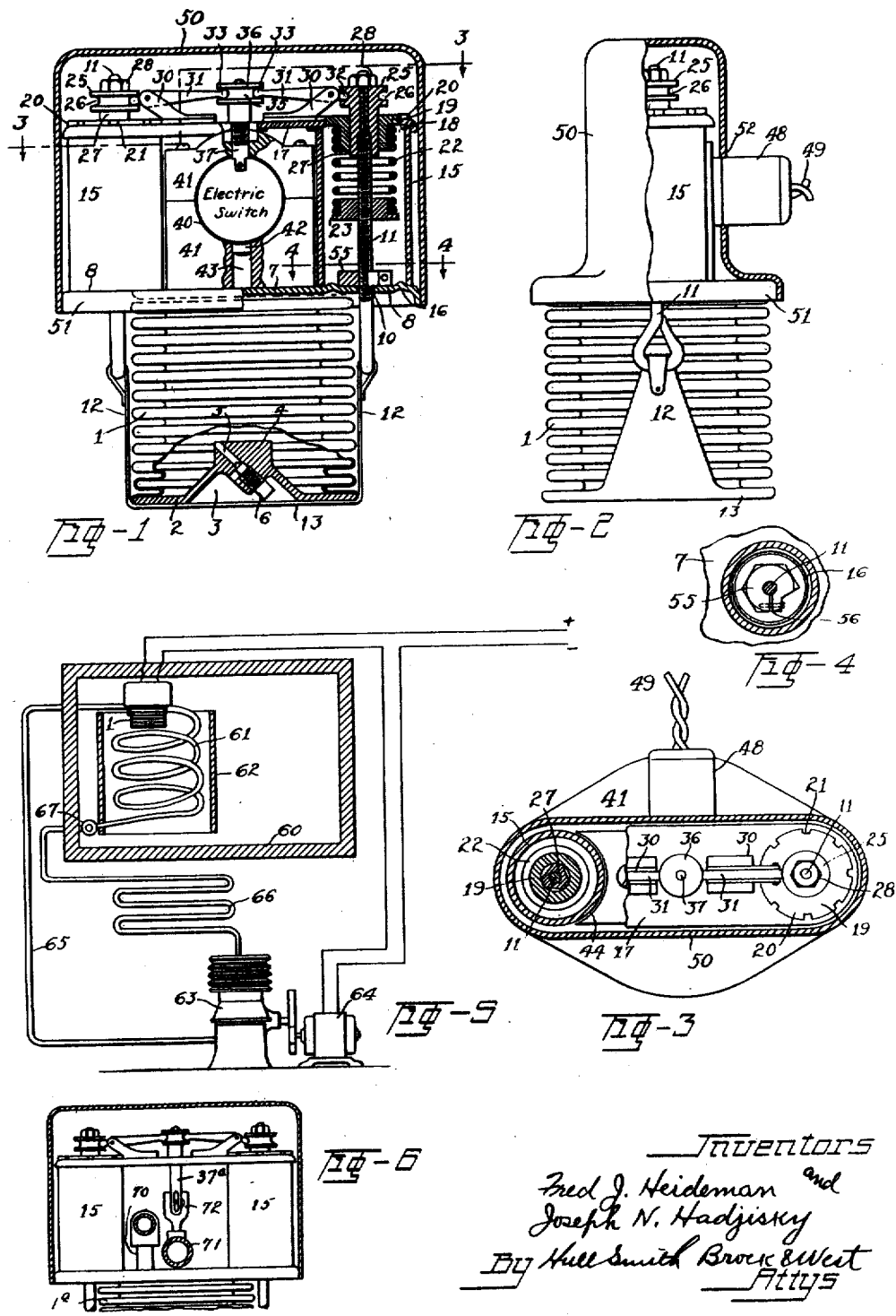

FRED J. HEIDEMAN AND JOSEPH N. HADJISKY, OF DETROIT, MICHIGAN, ASSIGNORS TO KELVINATOR CORPORATION, OF WILMINGTON, DELAWARE, A CORPORATION OF DELAWARE.

PRESSURE-OPERATED REGULATING APPARATUS.

1,329,351.  Specification of Letters Patent.  Patented Jan. 27, 1920.

Application filed January 14, 1918. Serial No. 211,752.

*To all whom it may concern:*

Be it known that we, FRED J. HEIDEMAN and JOSEPH N. HADJISKY, citizens of the United States, residing at Detroit, in the county of Wayne and State of Michigan, have invented a certain new and useful Improvement in Pressure-Operated Regulating Apparatus, of which the following is a full, clear, and exact description, reference being had to the accompanying drawings.

This invention relates to devices wherein a change in fluid pressure serves automatically to operate a controlling device, and has especial reference to that class of devices, called thermostats, wherein the change of pressure is produced by the evaporation or expansion of a contained fluid, although equally useful in cases wherein the pressure fluid is conveyed to the device from some outside source, as through a tube or pipe, and is produced mechanically instead of by thermal expansion. The particular device illustrated and described herein has been developed as a thermostat for refrigerating systems, especially those of a domestic type, and with the view to an electrical control, but is applicable to many other uses where thermostatic or other pressure-operated appliances are employed and is not restricted to an electrical control, since pneumatic or mechanical connection may be employed without change in the design, construction or mode of operation of any part of the device.

The objects of the invention are the provision of a pressure-operated device of higher sensitiveness and larger range of throw than previous devices of this nature; the provision of a pressure-operated device of simple and compact construction wherein a given change of pressure, whether caused by temperature change or otherwise, will be converted into a large mechanical movement at a high degree of force whereby positiveness and certainty of operation is secured and whereby the regulating function desired can be effected without the interposition of relays, transformers, and other sensitive and expensive devices; the provision of such a device which is adjustable throughout a wide range of pressure or temperature and one which will be simple to construct and adjust and not liable to get out of order; the provision of a thermostatic or pressure device of great sensitiveness wherein the operation produces a large degree of force and which is not harmed by subjection to very excessive pressures or temperatures; while further objects and advantages of the invention will become apparent as the description proceeds.

In the drawings accompanying and forming a part of this application we have shown one embodiment of our invention, although it will be understood that this drawing is illustrative only and is not to be taken in a limiting sense; we have also shown our improved device operating as a thermostat in combination with a refrigerating device and as located in a peculiar place in said device, but do not restrict ourselves to the use with refrigerating devices in any way, and do not in this application lay claim to the peculiar location and arrangement of the same where employed in refrigerating apparatus, which relation and association is comprised in and covered by our copending application filed January 14, 1918, Serial No. 211,751.

In these drawings Figure 1 represents a side elevation of our improved device operating as a thermostat, and Fig. 2 a side elevation of the same, certain parts being shown in section in each view; Fig. 3 is a horizontal sectional view taken upon the broken line 3—3 of Fig. 1 and looking in the direction of the arrows; Fig. 4 is a sectional view on the line 4—4 of Fig. 1; Fig. 5 is a diagrammatic view illustrating one of the many thermostatic uses of our device; and Fig. 6 illustrates the use of the said device for operating a fluid valve in accordance with fluid pressure in an external pipe.

Describing the parts by reference characters, 1 represents the corrugated sheet metal side wall of an extensible expansion vessel, said wall being made of thin flexible material as well understood in the art so as to operate like a kind of bellows. One end of said vessel preferably consists of a plate 2 formed with a depression 3 whose bottom is thickened as shown at 4 to provide for the filling aperture 5 and the needle valve 6 whereby it may be closed. The other end of the vessel is covered by the sheet metal plate 7 which extends beyond the wall 1 at each end as shown at 8, 8. The ends of the member 1 are secured to the respective closures by spinning, crimping, soldering, welding, or in any other suitable manner. The overhanging portions of the plate 7 are formed with apertures 10, one at each side of the expansion vessel, for the reception of longitudinally movable members such as the threaded bolts 11, 11 whose lower ends are attached to the upturned ears 12, 12 of a cap or stirrup 13 which embraces the bottom of the vessel and normally covers and protects the filling valve.

Located upon the upper side of the plate 7 are a pair of hollow shells 15, 15, each of which is preferably concentric with one of the bolts 11, the same being held in place in any suitable manner as by means of bosses 16 struck up from the plate 7. Upon the upper end of the shells is located a second plate 17 parallel to the plate 7 and likewise having apertures 18 concentric with the bolts 11. Rotatably mounted in each of these apertures is a collar 19 whose body portion projects into the shell 15 and whose flange 20 overlies the top of the plate 17, said flange being conveniently notched as shown at 21 to facilitate its rotation. Rigidly secured to the depending portion of this collar is a spiral spring 22 whose opposite end is rigidly attached to a nut 23 threaded upon the bolt 11. It will therefore be apparent that the tension of this spring will tend to hold the plate 17 rigidly in place upon the shells 15, 15 and will hold the stirrup 13 firmly upon the end of the expansion vessel, and that this tension can readily be adjusted by rotating the member 19 which rotation will be transmitted to the nut 23 through the medium of the spring 22. Rigidly secured to the upper end of each of the bolts 11, 11 is a nut 25 formed with a circumferential groove 26 and with an elongated shank 27 fitting slidably inside the member 19 which is suitably apertured for the purpose. This nut can be positioned and secured in any desired manner, the expedient here shown consisting of threading the same upon a reduced extension of the bolt 11 and securing it there by means of a lock nut 28. The sides of the shank 27 may also be chamfered away if desired as shown in Fig. 3 the better to prevent sticking.

Rigidly secured to the top of the plate 17 between the members 19, 19 are a pair of brackets 30, 30, in each of which is pivoted a lever 31 having at its one end a rounded portion 32 engaged in the groove 26 of the nut 25 nearest thereto. The opposite ends of these levers extend to a point adjacent to each other as shown in Figs. 1 and 3 and are similarly provided with rounded portions 33. The throw of these levers will depend upon the location of their pivot points, such location being shown here as at one-sixth of the distance from the ends 32, thus providing an increase of movement in the ratio of five to one.

The ends 33 of these levers are rece.. in the groove 35 of a nut 36 carried by a rod 37 depending through a central aperture in the plate 17, and to this rod is attached the controlling device which the thermostat is intended to operate. In the embodiment shown in Figs. 1 to 5, inclusive, this controlling device consists of a standard electric switch of the type wherein a pair of push buttons project through opposite sides of a small cylindrical casing, one of said buttons being depressed to make electric contact through the switch and the other being depressed to open the contact. In the present embodiment the casing of this switch is indicated at 40 and the same is located in an insulating housing here consisting of a split fiber block 41, one of the said buttons having been removed and substituted by the rod 37, and the other button, 42, being loosely received in a guideway 43. This fiber block can be secured in place in any desired manner, the preferred arrangement being that of grooving its ends as shown at 44 in Fig. 3 so that the same will straddle the shells 15, 15. With this arrangement it will be seen that a downward movement of the bolts 11, 11, caused by pressure inside the vessel 1, will elevate the levers 31, 31 and operate the switch in one direction, with consequent extension of the springs 22; and that upon a decrease in pressure inside the chamber 1 the springs 22 will operate to depress the levers 31 and operate the switch in the reverse direction. Whether the first operation serves to make or break the circuit through the switch depends upon the construction of the switch and the direction of its connection to the mechanism, and this will vary with circumstances; for use as a thermostat in refrigerating apparatus the switch is ordinarily applied in such a way that expansion of the chamber 1 will cause a closing of the circuit and contraction of that chamber the opening of the circuit.

One end of the switch casing is preferably provided with a pull-plug 48 from which leads the flexible cord 49.

The operating mechanism is preferably inclosed in a housing 50 of appropriate shape engaging the edge of the plate 7 which may conveniently be flanged over as shown at 51 to afford added stiffness and provide a seat for the housing. The rear wall of the housing is formed with an aperture 52 for the plug 48. This arrangement conveniently protects the operating parts against moisture, frost, dust and the like.

Ordinarily, for use as a thermostat, the container 1 is charged with a liquid which is particularly sensitive at the temperatures at which the thermostat is intended to operate; this condition being most easily met by employing a liquid whose boiling point lies just below the temperature range required; thus for use with an ammonia refrigeration system liquefied ammonia might be used in case the thermostat were intended to operate at or about the lowest limit of the system; and for temperatures ranging from about +15° F. to about +50° F. liquefied sulfur dioxid is highly convenient and satisfactory, although other volatile substances can be used. Owing to the fact that all of these substances boil at such low temperature and consequently produce a high pressure at ordinary atmospheric temperatures, it is necessary to provide a positive stop for the thermostat in order to prevent injury to the same during shipment, handling, or during a temporary discontinuance of the refrigeration. This is preferably accomplished by providing each of the bolts 11 with a stop nut 55 immediately above the plate 7, which stop nut may, if desired, be split and clamped as shown at 56 in Fig. 4 so as to prevent accidental displacement. This nut is adjusted so as to permit only the degree of movement of the levers 31 necessary to the controlling operation.

The employment of a plurality of spaced tension members insures that the operation of the controlling member (switch or valve) shall always be uniform and shall take place without canting, binding, or sticking. Also the use of a stop on each tension member, taken in conjunction with the use of a number of members (since we do not limit ourselves to two rods 11—11) produces a device that cannot be injured by pressures even far in excess of those which will operate it. The bellows-metal construction shown, while extremely elastic longitudinally, is extremely strong radially, and the device thus produced is safe under all conditions of operation. For example, this device when employed as a refrigerator thermostat is ordinarily filled with a volatile liquid as sulfur dioxid which produces a pressure of several pounds per square inch even at 32° F. and more than 100 lbs. per sq. in. at 120° F. which temperature is sometimes reached in transporation or in a hot climate when refrigeration is temporarily discontinued.

Inasmuch as the pressure generated inside the vessel 1, when the same is used as a thermostat, will vary with the temperature to which the same is subjected, adjustment of the device for temperature can be effected by rotating the members 19, 19 which as heretofore explained serves to vary the tension of the springs 22 which withstand that pressure. A certain degree of adjustment can also be effected by turning the nut 36, but this is not so desirable since it serves to vary the angles of the levers 31, 31 which ought to be kept as near perpendicular to the rod 37 as possible. The same operation also serves to adjust the device when used as a pressure control.

In Fig. 5 we have shown our improved thermostat suspended inside a refrigerator 60 in such a position as to be subjected both to the action of the terminal turns of the expansion coil 61 and to the convection currents flowing into the chamber 62 in which said coil is located. 63 represents the compressor which may be of any suitable or desired type and 64 the electric motor which drives the same so as to exhaust the refrigerant through the pipe 65 and return the same to the expansion coil by way of the condenser 66 and expansion valve 67. In the case of the ordinary domestic system, our improved thermostat can be connected directly in series with the motor as shown so as to control the same without the interposition of relays, transformers, or other devices and by suitably designing the size of the expansion vessel and type of switch this method of control is feasible for all capacities of apparatus up to that wherein the services of an attendant are warranted.

The same construction can equally well be adapted for operation by pressure derived otherwise than by the evaporation of liquid contained inside the expansion vessel, as for example by the action of fluid under pressure conveyed to the expansion vessel by piping; and the operation of the thermostat can be caused to control a valve equally well as an electric switch. In Fig. 6 we have shown our device arranged for pressure operation, the expansion vessed 1ᵃ being connected with a source of fluid under pressure by means of a pipe 70 in such wise that an increase in the pressure of the fluid will cause an expansion of the vessel and a consequent movement of the rod 37ᵃ, which in this case is shown as connected to a valve 71 by means of a lost motion connection 72 in such wise as to produce a quick and positive movement of the valve member as well understood in the art.

It will also be understood that a valve can be substituted for the electric switch in the arrangement shown in Figs. 1 to 5, inclusive, and the thermostat operation caused to control the refrigerant flow directly, by locating said valve in series with the expansion valve, other expedients being provided for controlling the compressor operation. In the case of an absorption system this valve arrangement can be used either to control the flow of refrigerant to the expansion valve or to control the supply of heating medium to the generator. Such a device is of use in many other relations; also it will operate just as well at pressures less than atmospheric as it will at positive pressures.

As a result of our improvements, a device is produced wherein the operating parts are immediately adjacent the expansion vessel, yet protected by the housing; the vessel is wholly exposed so that heating and cooling occurs with minimum lag; the device is wholly self-contained, can be moved about at will, can be filled at the factory, and need not be touched thereafter, though adjustment is easily performed; no danger of explosion or over-strain is present, even under greatly excessive pressures; and the operating force is transmitted from the vessel without any possibility of binding or sticking.

While we have described in detail the practical embodiment of our invention which at the present time appears the preferable one we do not limit ourselves to the details of construction or arrangement except as the same are specifically recited in the claims hereto annexed or rendered necessary by the prior state of the art.

Having thus described our invention, what we claim is:—

1. In a device of the character described, the combination, with an extensible metallic vessel, of a supporting plate covering one end of said vessel, a controlling device carried by the side of said plate opposite to said vessel, a longitudinally movable member traversing said plate and operatively connected to the opposite end of said vessel, and movement multiplying means operatively connecting said member to said device.

2. In a device of the character described, the combination with an expansible vessel having extensible cylindrical walls, of a supporting plate to which said vessel is presented endwise, a plurality of tension rods spaced about said vessel and attached to the distant end thereof, a controlling device carried by said plate upon the side opposite to said vessel, and means operatively connecting said rods to said device, said means including yielding elements whereby expansion of said vessel is opposed.

3. In a device of the character described, the combination with an axially extensible cylindrical vessel having side walls of circumferentially corrugated sheet metal, of a supporting member attached to one end of said vessel, a controlling device carried by said supporting member on the side opposite said vessel, a plurality of tension members traversing said supporting member and having their opposite ends operatively connected to said device and to the far end of said vessel, respectively, and yielding means connected to said rods and arranged to oppose the tension of said vessel.

4. A thermostat comprising a housing, controlling mechanism in said housing, an extensible metallic vessel located outside of said housing, one end of said vessel being presented to and fixed relatively to said housing and the direction of expansion and contraction being normal to said housing, and operative connections between said controlling mechanism and the free end of said vessel.

5. In a device of the character described, a support, an axially extensible cylindrical vessel located with one of its ends presented to said support, said vessel having side walls of circumferentially corrugated sheet metal and said support having a housing upon the side opposite said vessel, a controlling device in said housing, and operating members for said device traversing said support and extending along said vessel and attached to the free end thereof.

6. In a device of the character described, a housing, a controlling device inside said housing, an extensible cylindrical vessel outside said housing and having one of its ends presented to a wall thereof in immovable relation, and operating members traversing the wall of said housing and connected at one end with the free end of said vessel and at the other end to said controlling device.

7. In a device of the character described, a support, a longitudinally expansible vessel connected to one side of said support with its axis normal thereto, a plurality of tension members connected to the free end of said vessel and spaced symmetrically thereabout and traversing said support, a single movable member carried by the opposite side of said support and operatively connected to said tension members, and a controlling device operatively connected to said movable member, and means for positively limiting the outward movement of said tension members to the amount necessary to the operation of said controlling device.

8. In a device of the character described, a support, a longitudinally expansible vessel connected to one side of said support with its axis normal thereto, a plurality of tension members connected to the free end of said vessel and spaced symmetrically thereabout, a single movable member carried by the opposite side of said support and operatively connected to said tension members, spring means yieldingly opposing the outward movement of said tension members, and a controlling device operatively connected to said movable member.

9. In a device of the character described, a support, a longitudinally expansible vessel connected to one side of said support with its axis normal thereto, a plurality of tension members connected to the free end of said vessel and spaced symmetrically thereabout and traversing said support, a single movable member carried by the opposite side of said support and operatively connected to said tension members, spring means arranged to oppose the outward movement of said tension members and to operate said movable member upon the inward movement of said tension members, means for varying the tension of said spring means, and a controlling device operatively connected to said movable member.

10. In a device of the character described, a support, a longitudinally expansible vessel connected to one side of said support with its axis normal thereto, a plurality of tension members connected to the free end of said vessel and spaced symmetrically thereabout and traversing said support, a spring connected to each of said tension members and yieldingly opposing its outward movement, means for varying the tension of each spring, a single movable member carried by said support and operatively connected to each of said tension members, and a controlling device operatively connected to said movable member.

. In a device of the character described, a pair of spaced plates, a controlling device located between said plates and having a reciprocable stem, a longitudinally expansible vessel connected to the outer side of one plate with its axis normal to both plates and parallel to said stem, a plurality of tension members attached to the free end of said vessel and spaced about said vessel, and traversing said plates, a spring connected to each tension member and to one of said plates arranged to oppose the outward movement of the members, means for varying the tension of the springs, and a plurality of levers pivoted to the plate which is farthest from said vessel, there being one lever for each tension member, one end of each lever being operatively connected to its respective tension member and the opposite ends of all the levers being operatively connected to said stem.

12. In a thermostat, a longitudinally expansible metal vessel having elastic walls and rigid ends, a controlling device secured to one end of said vessel, a filling opening formed in the opposite end of said vessel, means closing said filling opening, a cap covering the free end of said vessel and the filling closure, and a plurality of tension devices arranged around said vessel each having one end attached to said cap and its opposite end operatively connected to said controlling device.

13. In a high-pressure thermostat, a longitudinally expansible metal vessel adapted to receive volatile liquid and having a solid end, a movable member carried by said end, a plurality of tension members operatively connected to said movable member and spaced around the exterior of said vessel parallel to its axis of expansion, the outer ends of said tension members being attached to the free end of said vessel and each of said members having a positive stop adapted to coöperate with the solid end of said vessel to limit the expansion of said vessel to a predetermined amount.

14. In a high-pressure thermostat, a cylindrical metal vessel having circumferentially corrugated walls designed to permit longitudinal expansion while preventing radial expansion, a rigid base for one end of said vessel, a plurality of tension members spaced about said vessel parallel to its axis, one end of each member being attached to the free end of said vessel, a stop carried by each member and coöperating with said base to limit the expansion of said vessel to a predetermined amount, and a controlling device adapted to be actuated by the expansion and contraction of said vessel.

15. The combination of a supporting member, a longitudinally expansible vessel held against one side thereof, an electric switch mounted on the opposite side thereof, and an operative connection having a part extending through said supporting member and connecting the far end of said vessel and the movable member of the switch, said connection including a motion multiplying means.

In testimony whereof, we hereunto affix our signatures.

FRED J. HEIDEMAN.
JOSEPH N. HADJISKY.